United States Patent
Behbehani

(10) Patent No.: US 9,442,467 B1
(45) Date of Patent: Sep. 13, 2016

(54) EVENT TRIGGERED DATA LOCKBOX CAPABLE OF ANONYMOUS REVELATION

(71) Applicant: Taher G Behbehani, Chevy Chase, MD (US)

(72) Inventor: Taher G Behbehani, Chevy Chase, MD (US)

( * ) Notice: Subject to any disclaimer, the term of this patent is extended or adjusted under 35 U.S.C. 154(b) by 486 days.

(21) Appl. No.: 13/756,529

(22) Filed: Jan. 31, 2013

Related U.S. Application Data

(60) Provisional application No. 61/592,646, filed on Jan. 31, 2012.

(51) Int. Cl.
 *G05B 1/01* (2006.01)
 *G06Q 10/10* (2012.01)
 *G06F 21/62* (2013.01)

(52) U.S. Cl.
 CPC .............. *G05B 1/01* (2013.01); *G06Q 10/10* (2013.01); *G06F 21/6218* (2013.01)

(58) Field of Classification Search
 CPC ................... G06Q 10/10; G06F 21/6218
 USPC ............... 340/5.73; 700/215; 705/1, 27, 72; 726/1; 709/228; 206/575
 See application file for complete search history.

(56) References Cited

U.S. PATENT DOCUMENTS

| | | | |
|---|---|---|---|
| 5,312,008 A | | 5/1994 | Davis |
| 5,651,117 A | | 7/1997 | Arbuckle |
| 6,246,991 B1 * | | 6/2001 | Abe et al. ............... 705/311 |
| 6,760,731 B2 | | 7/2004 | Huff |
| 8,140,847 B1 * | | 3/2012 | Wu ............................. 713/175 |
| 2002/0069159 A1 * | | 6/2002 | Talbot et al. ............... 705/38 |
| 2004/0252018 A1 | | 12/2004 | Shuster |
| 2005/0082199 A1 | | 4/2005 | Pazdro |
| 2006/0256959 A1 * | | 11/2006 | Hymes ................. H04M 1/26 379/433.04 |
| 2007/0061471 A1 | | 3/2007 | Glover et al. |
| 2008/0184334 A1 | | 7/2008 | Hebert et al. |
| 2009/0248680 A1 * | | 10/2009 | Kalavade .................. 707/5 |
| 2009/0254390 A1 * | | 10/2009 | Megiddo et al. ........... 705/7 |

(Continued)

FOREIGN PATENT DOCUMENTS

| | | |
|---|---|---|
| KR | 20020082304 | 10/2002 |
| WO | 9422736 | 10/1994 |

(Continued)

OTHER PUBLICATIONS

English Language Abstract for KR 2002-0082304.

(Continued)

*Primary Examiner* — Jennifer Mehmood
*Assistant Examiner* — Omar Casillashernandez
(74) *Attorney, Agent, or Firm* — Patents and Licensing LLC; Daniel W. Juffernbruch

(57) ABSTRACT

An event triggered data lockbox is capable of anonymous revelation. The personal information for a person is saved in a secure memory. A lockbox condition for access to the secure memory is determined. Upon satisfaction of the lockbox condition, anonymous revelation of a masked profile for the personal information in the secure memory is permitted. As an example, a masked profile may be sent to a bank for loan qualifications and includes a credit score or summary characteristics. The lockbox condition comprises a time or an event associated with the person. In an alternative embodiment, the personal information can be fully revealed upon satisfaction of certain lockbox conditions such as an event such qualification for a loan or as a particular birthday age or death.

16 Claims, 3 Drawing Sheets

(56) References Cited

U.S. PATENT DOCUMENTS

| | | |
|---|---|---|
| 2009/0307141 A1 | 12/2009 | Kongalath et al. |
| 2010/0049632 A1 | 2/2010 | Friedman |
| 2010/0234981 A1 | 9/2010 | Turner |
| 2010/0241617 A1* | 9/2010 | Murphy et al. ............... 707/665 |
| 2011/0161279 A1* | 6/2011 | Rao et al. ....................... 706/52 |

FOREIGN PATENT DOCUMENTS

| | | | |
|---|---|---|---|
| WO | 02053954 | 7/2002 | |
| WO | 2009023938 | 2/2009 | |
| WO | WO 2009070885 A1 * | 6/2009 | ........... G06Q 10/109 |

OTHER PUBLICATIONS

How to Supercharge All Your Favorite Webapps with ifttt, LifeHacker.com by Adam Pash Sep. 21, 2011, accessed Feb. 1, 2013 http://lifehacker.com/5842307/how-to-supercharge-all-your-favorite-webapps-with-ifttt.

Ifttt the beginning . . . , IFTTT Blog, blog.ifttt.com by Linden Tibbets, Dec. 14, 2010, accessed Feb. 1, 2013 http://blog.ifttt.com/post/2316021241/ifttt-the-beginning.

Ifttt—Your Personal Assistant for Internet Tasks, bloggingtips.com posted by Charnita Fance, Jan. 29, 2011, accessed Feb. 1, 2013 http://www.bloggingtips.com/2011/01/29/iftt-your-personal-assistant-for-internet-tasks/.

* cited by examiner

EVENT TRIGGERED DATA LOCKBOX CAPABLE OF ANONYMOUS REVELATION

BACKGROUND OF THE INVENTIONS

1. Technical Field

The present inventions relate generally to a data lockbox and, more specifically, relate to a data lockbox capable of anonymous on an event.

2. Description of the Related Art

On Aug. 22, 2007 Potbelly Sandwich Works planned a celebration of its 30th Anniversary with "Random Acts of Potbelly" in every store. In Illinois, Indiana, and Wisconsin you could put a message in the time capsule and they will e-mail it to you in 30 years when it is opened.

SUMMARY OF THE INVENTIONS

An event triggered data lockbox is capable of anonymous revelation. The personal information for a person is saved in a secure memory. A lockbox condition for access to the secure memory is determined. Upon satisfaction of the lockbox condition, anonymous revelation of a masked profile for the personal information in the secure memory is permitted. As an example, a masked profile may be sent to a bank for loan qualifications and includes a credit score or summary characteristics. The lockbox condition comprises a time or an event associated with the person. In an alternative embodiment, the personal information can be fully revealed upon satisfaction of certain lockbox conditions such as an event, qualification for a loan or as a particular birthday age or death; or absence of an event, such as logging into the system on a pre-determined interval The details of the preferred embodiments will be more readily understood from the following detailed description when read in conjunction with the accompanying drawings wherein:

DETAILED DESCRIPTION OF THE PREFERRED EMBODIMENTS

Figure 1:
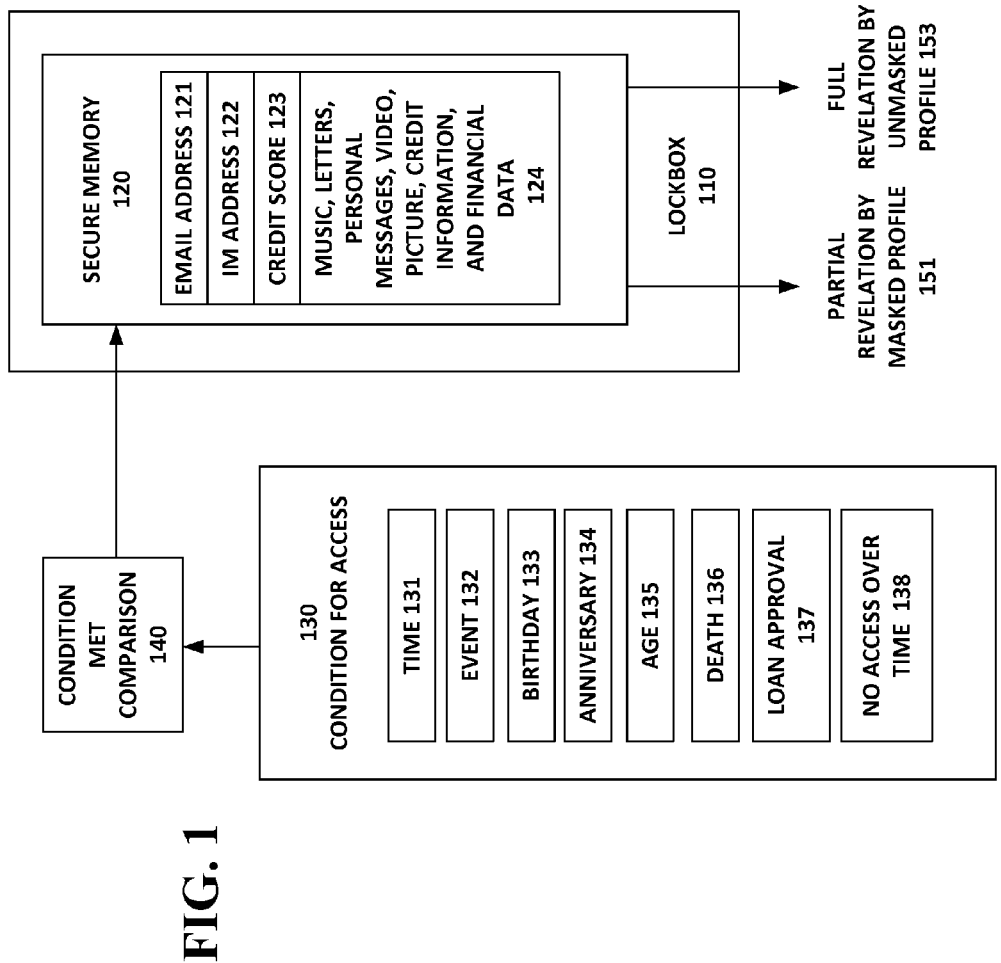
FIG. 1 is a block diagram of the present invention illustrating the lockbox and a condition for access.

FIG. 1 is a block diagram of the present invention illustrating the lockbox 110 and conditions for access 130 with various revelations 151 or 153. A condition event triggers access to the secure memory 120 of the data lockbox 110. Upon one of many the condition event triggers, an anonymous revelation 151 or 153 can be made. Personal information is saved for a person in a secure memory 120. A lockbox condition for access 130 to the secure memory 120 is determined. Anonymous revelation is permitted when a condition is met at 140. A masked profile 151 for the personal information in the secure memory 120 can be revealed partially upon satisfaction of predetermined lockbox conditions. A masked profile 151 for the personal information in the secure memory 120 can also be revealed upon satisfaction of other predetermined lockbox conditions such as no access over a predetermined time 138 causes a predetermined secret to be emailed to a recipient. A full, unmasked profile 153 for the personal information in the secure memory 120 can alternatively be revealed upon satisfaction of other lockbox conditions.

The permitting anonymous revelation of the masked profile searches and matches masked profiles of more than one person against candidate recipients such as one or more banks. The masked profile revealed can be revealed to such a bank.

The masked profile revealed can have alias contact information chosen from the group consisting of an email address 121 or an IM address 122. The masked profile revealed can be a credit score 123 or have summary characteristics.

The secure memory 120 contains data chosen from the group consisting of music, letters, personal messages, video, picture, credit information, and financial data 124.

The lockbox condition for access to the secure memory 120 has a time 131 associated with the person.

The lockbox condition for access to the secure memory 120 has an event 132 associated with the person. The event is an event chosen from the group consisting of a birthday 133, an anniversary 134, a death 136, a specified anniversary of death, an age 135 of a child or adult, and acceptance of contract offer 137.

Anonymous revelation of the masked profile 151 occurs upon satisfaction of a lockbox condition.

Fully revealing the personal information 153 can also occur in an un-masked profile upon satisfaction of a lockbox condition.

The lockbox 110 uses a processor 140 for determining a lockbox condition for access to the secure memory, for determining a masked profile for the personal information, and permitting anonymous revelation of a masked profile for the personal information in the secure memory upon satisfaction of the lockbox condition.

Figure 2:
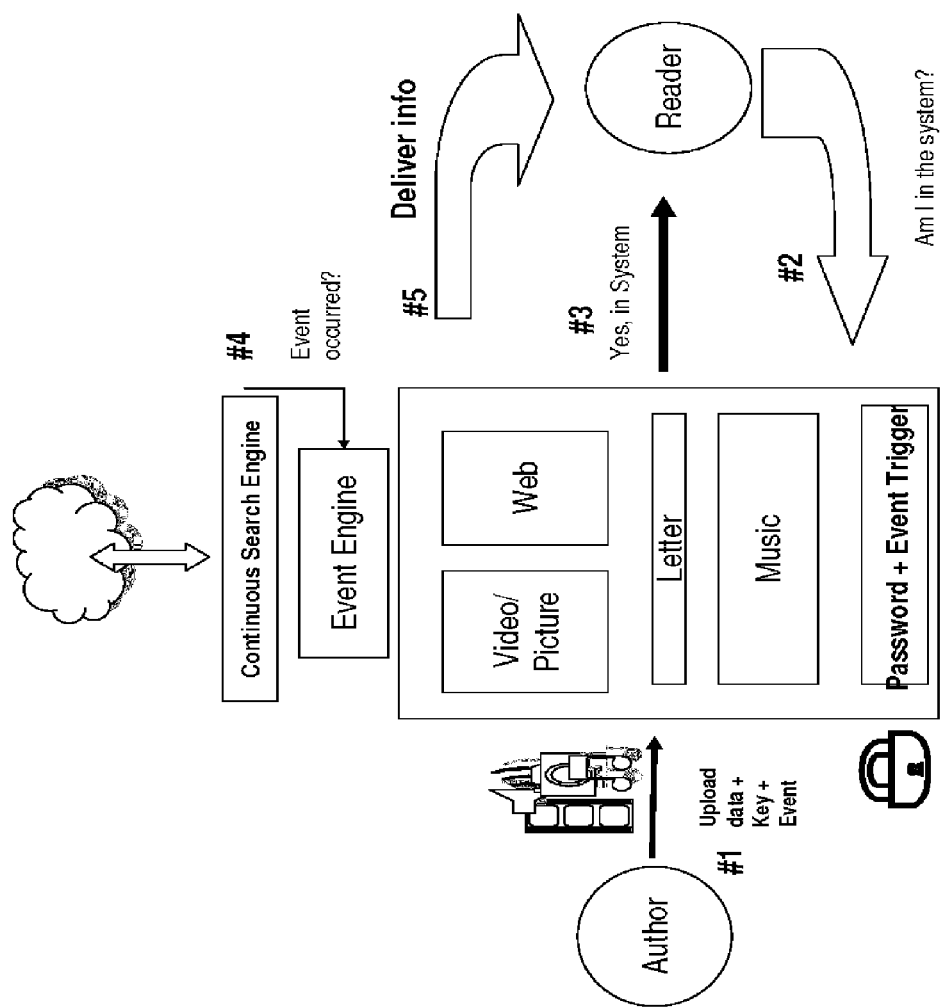
FIG. 2 is a block diagram of the present invention illustrating the components of a Bonding Server.

FIG. 2 is a block diagram of the present invention illustrating the components of the Bonding Server. Web sites can be designed to hold information created by a person, mobile device, electronic tablet, another website, or entity (Company) "Author" and release it to another person, mobile, or entity ("Reader") upon occurrence of a certain event or events ("Event") such as time, or trigger/notification by Bonding Server (from provisional patent). Events can be Asynchronous—Author and Reader communicate at different times, independent of each other, or Synchronous: both Author and Reader are communicating real time via the Web-site. Release of information can be between Author and another party that is known to the Author (i.e. family member, colleague, etc.) or between Author or unknown third party or Company at the time of compiling the information. In the case of a time capsule, an Author knows the receiving party; and creates access combination based on a shared personal knowledge, i.e., father to daughter, share a known fact unavailable to others. An example in the case of banking information; the Author (user) does not know the Bank, so information is released only if a search or a matching engine permit. In an example of a dynamic social networking, the Author does not know third party, so a similar mechanism to the banking example is used.

Details of Future Forward Message (FFM) placement are as follows:

Author, person wishing to place content on the site for future retrieval creates an account on FF site.

Content, including video, audio, multi-media information; letters, emails, links to websites; etc. is placed by Author on the web site (uploaded onto the web-site)

Author creates a set of passwords, consisting of keywords, phrases, songs, GPS trigger, or data retrieved from social networking site using social graph data mining techniques, from Bonding Server, which will be used later by "Reader" to unlock the message, at the Event. Password can be a unique combination of items or an exact match of pre-specified number of items as defined by Author. Password can be GPS triggered-only as well.

FFM can be placed by Author at any time on FF site, without any notification to the Reader.

FFM can also be placed on FF site by Author, and the Author has the choice of making his name anonymous.

Reader can at any time, search FF site under his or her name, or by a combination of other special identifiers such as nick name, birth date, etc. Reader can also search by his name and the name of the Author. For example, a father, John Smith, wants to write a letter for his daughter Jane, who is now 5 to be read by Jane when she is 16 years old. At any time, Jane can search the site for her name, her father name, and their first pet dog. FF site will then tell Jane there is a message deposited for her, but she can only read it after her $16^{th}$ birth day.

Similarly, Father can place letter on the website, add GPS/Location bonding as trigger, and when Jane is in the proximity; the letter is released to her.

FFM can be released by Jane, prior to the Event, in case of death, and upon entering a valid death certificate number from a given state. In this case, a FFM could also act as a Living Will, placed in care of the system.

The FFM can also be sent in the absence of Event, i.e. if the Author does not sign in and enter the correct set of passwords, FFM will be automatically forwarded to a recipient or group of recipients.

FFM relating to Release of Personal Data (used for storage of banking information, mortgage application, etc.)

A mobile communication device of a social networking system may upload tagged information to the Bonding Server. At the same time it may be stored on a SIM card, or soft SIM card such as the memory card, in case of smart PDAs or MP3s, etc.

The credentials of a mobile communication device of a social networking system such a group memberships and location, for example, can be used as the or one of the necessary lockbox condition to permit anonymous revelation of a masked profile for the personal information in the secure memory or full revelation of the personal information in memory.

Figure 3:
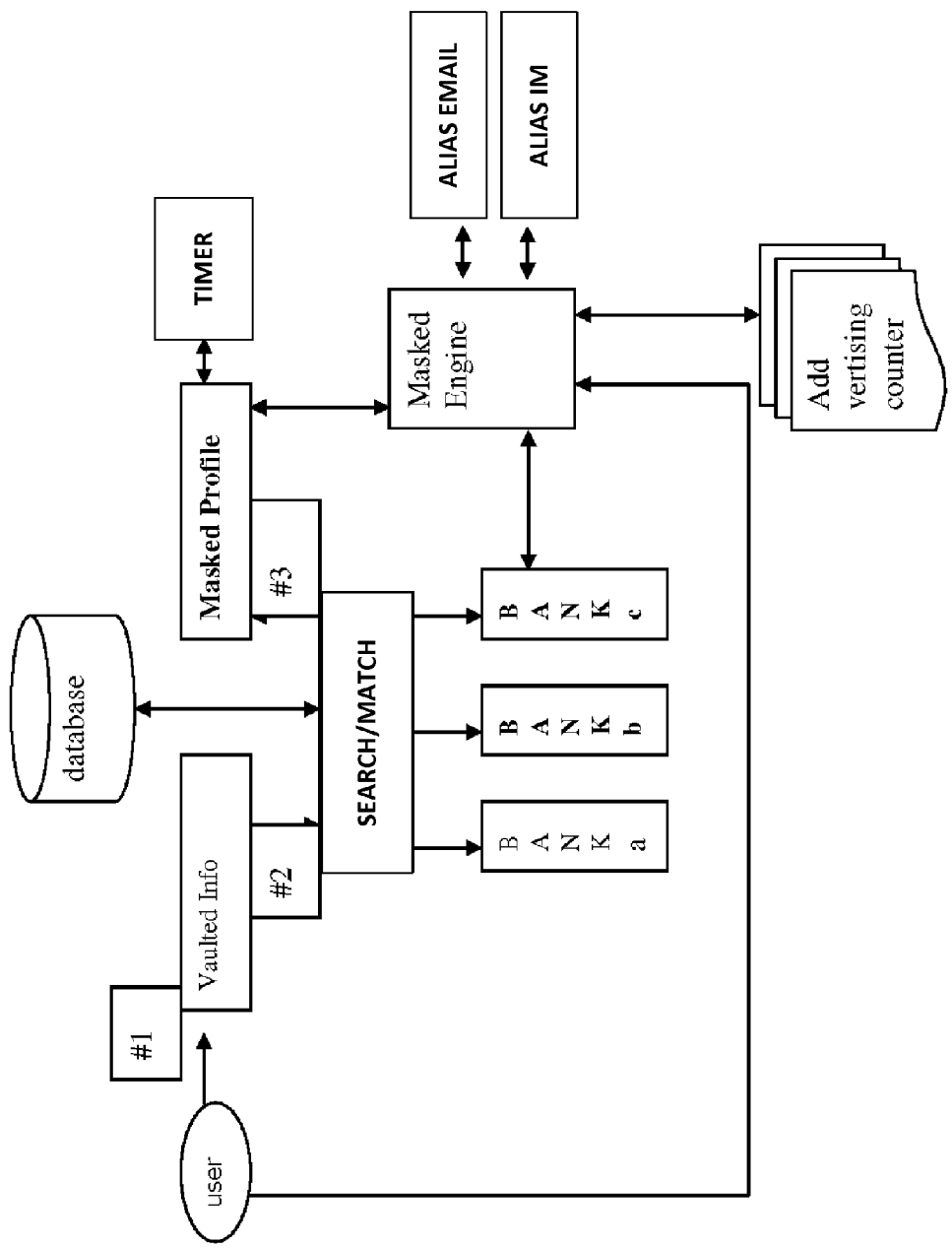
FIG. 3 is a block diagram of the present invention illustrating the interactions between a User and the Bonding Server.

FIG. 3 is a block diagram of the present invention illustrating the interactions between the User and Bonding Server.

Method of an exemplary embodiment:
1. User enters information into Vault—Social Security; address, other confidential info
2. User initiates search (or system initiates automatically) tied to a search engine, or social networking site, or site such as Facebook or Linkedin, or information contained on another website. A pricing engine may be used in an alternate embodiment which will be described in a separate section.
3. Search Engine access data base, identifies the match results (shown in three Bank boxes);
4. Result of the search, relating to the specific search, in addition to the information in the Vault, is placed in Masked Profile—
5. From this point onwards; only masked information is exchanged to the third party, through the Masked Engine.
6. Masked profile can also include an alias email or instant messaging account.
7. Timer is initiated—Timer is used to expunge information; per request of user; weekly, daily, monthly, etc.
8. User, at his decision, can review search result, select the bank or banks to obtain additional information. All contact from the user is managed by the Masked Engine;
9. Banks selected by the User only receive masked Info, which includes the result of search and a file ID. Masked information also include an Alias phone number, and email; all provided by the Masked Engine.
10. Masked information tracks all information exchanged between the masked file and the Bank.
11. Any communication between User and Bank will take place via the masked engine and Alias email or instant messaging
12. If the exchange of the information between the User and the Bank is acceptable to the User, User can then choose to proceed; user triggers an unlock of the real information; and the real info is sent to the Bank; by the Masked Engine.
13. Otherwise, the Timer runs out and erases information kept in the masked file. The Bank has no ides of the real social security number, phone or email of the user. User can not be reached or targeted for telemarketing.
14. Upon first exchange of information via Alias Email or IM; Add Counter places a cookie on User PC and keeps tack and count of all information exchange between Mask Engine, Banks, and User directly to Banks.
15. For the purpose of creating a revenue model, and "information Toll" mechanism is created; whereby the Banks who wish to advertise, pay the web service a fee using a weight assigned to the incidents of information toll, for example: each information exchange between Masked Engine and Bank has a weight of 1, whereas information release from Vault (step 9) has a weight of 5.
16. Thus the add calculation engine is not a pay per click or a flat rate for selling user information as is in the Lending Tree Model An example of the method is as follows according to one exemplary embodiment:
1. Social network authenticates validity of information.
2. Is Fred 60 years old?
3. Is it the right Fred?
4. If Fred has certain friends and it is Fred's birthdate and certain time or events have passed, then release information (or condition of communication is ceases for period of time).
5. In addition, social graph data mining can be used to answer the questions, such as if Fred linked to John, Jill, and Mark via Facebook; each of who are then connected to others, directly or indirectly linked to Fred.
6. Examples are release arte via social network, e.g., Facebook, or by email. E.g., Gmail.
7. By an electronic presence in the cloud—email, Facebook—then can notify anonymously that the revealed person has created lockbox for you.

Failure to "check-in" by Author can alternatively be a condition for release of information to recipient. In this case, Author sets system setting to receive check-in notifications on a pre-determined basis (via auto-generated email messages or direct log in to the system by Author). In case system detects Failure to check-in, system forwards FFM to recipient as designated by Author. Also dual control can be implemented. Also other things, date/time, location, biometrics, can be implemented. Can confirm event by search of death websites. Biometric—input to system can be via a biometric device, acting as positive trigger for release of information. Perhaps a DNA matching device providing positive input would be the ultimate trigger for not only authenticating but locating future unknown matching family members. A buddy social network can be triggered based on topics or keywords blogged or typed: Author places information on website, locked by certain conditions, some of which are keywords or a combination of key words.

Also within the scope of this invention are business models for the social networking service, for example, as follows:

a. Service offered by a third party Bonding Service via a carrier or directly using a carriers network
 b. All necessary device SW for the device is installed via a SIM card or Flash memory card free of charge to the user, i.e. instead of an empty memory card, the user will have a memory card for his own use, with pre-loaded SW on it
 c. In return for the use of the free memory card, the user accepts to receive advertising or promotions from vendors or businesses in close proximity.
 d. Businesses would pay for and use the information stored on the bonding server as means of sending targeted advertising to the devise; i.e. when two friends are finding each other in an airport, a message is displayed on both phones for Starbuck's coffee location In case of conferences, the conference promoter would ask allow for a fee, the companies displaying products to showcase their products on a web site. Prior to arriving at or at the conference location, the user would select which products he is interested in. Once at the conference location, user would be notified when he is close to a booth or display of a company of interest with a promotional message.

Additional security and trust parameters can be implemented, such as designating friends in a social network such as Facebook as trustees (or via a person belonging to Social Graph data as outlined above). The human trustee would have the power to confirm certain of the examples above of parameters have been met before release of the FFM. The human trustee may also be verified by his/her social graph and specified links. For example, Fred' brother can be designated human trustee, linked to Fred and his brother's cousin or common high school friend on Facebook. Using both a human trustee and machine driven condition would also provide improved reliability. The social network platform can be used to manage the satisfaction of conditions and approvals by the trustee before automatically releasing and delivering the FFM. The author can also sets up how many trustees have to approve to help alleviate trustee fraud or neglect.

A pricing engine can be used as a third party to store and forward a secret up on a match of certain conditions. This can not only be used to authenticate a user, but it can also be used to unblock a secret. A pricing engine is defined as an online or digital system used to correlate and find specific information based on personally identifiable information such as social security, birth date, income level, etc. Examples of pricing engines are mortgage and insurance bidding websites where a shopper reveals personal information to the website but the website does not reveal it to the third party until a certain qualification and preliminary agreement to do business conditions has been met.

The present inventions provide embodiments for a virtual time capsule that is reliable ad automated as secured and managed on a social network messaging community platform.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. A method for event triggered data lockbox capable of anonymous revelation, comprising the steps of:
 (a) saving personal information for an author of the personal information in a secure memory;
 (b) determining a lockbox condition for access to the secure memory;
 (c) identifying a user of a social networking system identified by a masked profile for the personal information in the secure memory upon satisfaction of the lockbox condition;
 (d) anonymously notifying the user of the social networking system identified by the masked profile identified in said step (c) of the availability of the personal information; and
 (e) permitting anonymous revelation to the user of the social networking system identified in said step (c) of the masked profile for the personal information in the secure memory including anonymity of a name of the author upon satisfaction of the lockbox condition;
 wherein the identifying and the permitting anonymous revelation of the masked profile of said steps (c) and (e) comprise a substep of requiring a human trustee to confirm certain parameters of the masked profile have been met in addition to a machine driven making condition.

2. A method according to claim 1, wherein the identifying and the permitting anonymous revelation of the masked profile of said steps (c) and (e) comprise a substep of searching and matching masked profiles of more than one persons against candidate recipients through a bonding service in a bonding server.

3. A method according to claim 2, wherein the candidate recipient comprises one or more lenders.

4. A method according to claim 1, wherein the masked profile revealed in said step (e) is revealed to a lender.

5. A method according to claim 1, wherein the masked profile revealed in said step (c) comprises an alias contact information chosen from the group consisting of an email address and an IM address.

6. A method according to claim 1, wherein the masked profile revealed in said step (e) comprises a credit score.

7. A method according to claim 1, wherein the secured memory contains data chosen from the group consisting of music, letters, personal messages, video, picture, credit information, and financial data.

8. A method according to claim 1, wherein the lockbox condition for access to the secure memory in said step (b) comprises a time associated with the person.

9. A method according to claim 1, wherein the lockbox condition for access to the secure memory in said step (b) comprises an event associated with the person.

10. A method according to claim 9, wherein the event is an event chosen from the group consisting of a birthday, an anniversary, a death, a specified anniversary of death, an age of a child, and acceptance of contract offer.

11. A lockbox apparatus for securing personal information and anonymous revelation thereof, comprising: a secure memory for storing personal information for an author of the personal information; and a processor configure to;

determining a lockbox condition that allows access to the secure memory;

determining a masked profile for the personal information;

identifying a user of a social networking system identified by the masked profile for the personal information in the secure memory upon satisfaction of the lockbox condition;

anonymously notifying the user of the social networking system identified by the masked profile of the availability of a lockbox containing the personal information, and permitting anonymous revelation to the identified user of the social networking system of the masked profile for the personal information in the secure memory including anonymity of a name of the author upon satisfaction of the lockbox condition, wherein the processor requires a human trustee confirms certain parameters of the masked profile have been met in addition to a machine driven making condition before identifying the user and permitting anonymous revelation.

12. A lockbox apparatus according to claim 11, wherein the secure memory stores personal information comprising a personal message by the author; and wherein the processor anonymously reveals the personal information including an anonymous personal message by the author.

13. A lockbox apparatus to claim 11, wherein the processor manages a social networking system.

14. A lockbox apparatus to claim 11, wherein the processor uses a bonding service via a bonding server to deploy anonymous revelation.

15. A method according to claim 1, wherein the personal information saved in said step (a) in the secure memory comprises a personal message by the author; and wherein the anonymous revelation of the personal information permitted in said step (c) is an anonymous personal message by the author.

16. A method according to claim 1, wherein said method comprises social networking management steps performed on a social networking system.

* * * * *